US009812730B2

(12) United States Patent
Otts et al.

(10) Patent No.: US 9,812,730 B2
(45) Date of Patent: Nov. 7, 2017

(54) BIOCOMPATIBLE WIRE BATTERY

(75) Inventors: Daniel B. Otts, Jacksonville, FL (US); Katherine Rowan Hardy, Jacksonville, FL (US); Randall Braxton Pugh, St. Johns, FL (US); Edward Kernick, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 457 days.

(21) Appl. No.: 13/196,210

(22) Filed: Aug. 2, 2011

(65) Prior Publication Data
US 2013/0034760 A1 Feb. 7, 2013

(51) Int. Cl.
*H01M 10/36* (2010.01)
*H01M 10/04* (2006.01)
*H01M 4/66* (2006.01)
*H01M 10/05* (2010.01)
*H01M 4/50* (2010.01)
(Continued)

(52) U.S. Cl.
CPC ......... *H01M 10/04* (2013.01); *H01M 2/0202* (2013.01); *H01M 4/50* (2013.01); *H01M 4/54* (2013.01); *H01M 4/661* (2013.01); *H01M 4/663* (2013.01); *H01M 4/668* (2013.01); *H01M 4/75* (2013.01); *H01M 10/0436* (2013.01); *H01M 10/05* (2013.01); *H01M 10/287* (2013.01); *H01M 10/425* (2013.01); *H01M 2220/30* (2013.01); *Y02E 60/124* (2013.01); *Y10T 29/49108* (2015.01)

(58) Field of Classification Search
CPC ...... H01M 10/58; H01M 10/32; H01M 10/28; H01M 2004/025; H01M 2004/022

USPC ................................................. 429/238, 233
See application file for complete search history.

(56) References Cited

U.S. PATENT DOCUMENTS 1,390,765 A 9/1921 Cox
1,559,562 A 11/1925 Edison
(Continued)

FOREIGN PATENT DOCUMENTS

JP 2004305313 A 11/2004
JP 2006507541 A 3/2006
(Continued)

OTHER PUBLICATIONS

Neudecker, Bernd J. et al., "Power Fibers: Thin-Film Batteries on Fiber Substrates" Report Documented by ITN Energy Systems, Inc., Littleton, CO, Approved for public release, distribution unlimited, pp. 1-9, 2003.

(Continued)

*Primary Examiner* — Stephan Essex
(74) *Attorney, Agent, or Firm* — Carl J. Evens

(57) ABSTRACT

A rechargeable electrochemical battery in the form of a single or multi-stranded wire assembly may be utilized as a power source for any number of implantable or non-implantable medical devices. As the wire form battery may be scaled to micro size, it may be utilized to power medical devices that were traditionally non-active devices, but which may be enhanced with active components. The wire form battery may be cut to size for a particular application which provides the same open circuit voltage regardless of how the wire is ultimately configured and the length of the wire utilized. Although the battery is in wire form, various arrangements of the components within the battery are also possible.

1 Claim, 6 Drawing Sheets

(51) Int. Cl.
  *H01M 4/54* (2006.01)
  *H01M 4/75* (2006.01)
  *H01M 2/02* (2006.01)
  *H01M 10/28* (2006.01)
  *H01M 10/42* (2006.01)

(56) References Cited

U.S. PATENT DOCUMENTS

| | | | |
|---|---|---|---|
| 2,871,281 A | 1/1959 | Moulton et al. | |
| 2,991,324 A | 7/1961 | Vogt | |
| 3,353,998 A | 11/1967 | Langguth et al. | |
| 4,522,897 A | 6/1985 | Walsh | |
| 5,430,693 A | 7/1995 | Ganter et al. | |
| 5,492,782 A | 2/1996 | Higley | |
| 5,928,808 A | 7/1999 | Eshragh | |
| 6,004,691 A | 12/1999 | Eshraghi | |
| 6,134,188 A | 10/2000 | Ganter et al. | |
| 6,168,884 B1 | 1/2001 | Neudecker et al. | |
| 6,242,132 B1 | 6/2001 | Neudecker et al. | |
| 6,282,668 B1 | 8/2001 | Neudecker | |
| 6,434,429 B1 | 8/2002 | Kraus et al. | |
| 6,470,215 B1 | 10/2002 | Kraus et al. | |
| 6,490,487 B1 | 12/2002 | Kraus et al. | |
| 6,544,171 B2 | 4/2003 | Beetz et al. | |
| 6,553,262 B1 | 4/2003 | Lang et al. | |
| 6,574,509 B1 | 6/2003 | Kraus et al. | |
| 6,622,043 B1 | 9/2003 | Kraus et al. | |
| 6,770,176 B2 | 8/2004 | Benson et al. | |
| 6,893,395 B1 | 5/2005 | Kraus et al. | |
| 7,407,728 B2 | 8/2008 | Wenneis et al. | |
| 7,901,811 B2 | 3/2011 | Hambitzer et al. | |
| 7,959,769 B2 | 6/2011 | Zhang et al. | |
| 7,993,773 B2 | 8/2011 | Snyder et al. | |
| 2003/0059526 A1 | 3/2003 | Benson et al. | |
| 2003/0064292 A1 | 4/2003 | Neudecker et al. | |
| 2003/0068559 A1 | 4/2003 | Armstrong et al. | |
| 2005/0271796 A1 | 12/2005 | Neudecker et al. | |
| 2006/0038536 A1 | 2/2006 | LaFollette et al. | |
| 2006/0210877 A1* | 9/2006 | Manko et al. | 429/217 |
| 2006/0234121 A1* | 10/2006 | Kim | H01M 4/621 |
| | | | 429/217 |
| 2008/0187824 A1* | 8/2008 | Tomantschger | 429/122 |
| 2008/0241683 A1* | 10/2008 | Fensore | H01M 4/06 |
| | | | 429/206 |
| 2010/0178543 A1* | 7/2010 | Gruner et al. | 429/121 |
| 2010/0261071 A1* | 10/2010 | Lopatin et al. | 429/345 |
| 2011/0287318 A1* | 11/2011 | Loveness et al. | 429/218.1 |

FOREIGN PATENT DOCUMENTS

| | | |
|---|---|---|
| JP | 2008512348 A | 4/2008 |
| JP | 2011517659 A | 6/2011 |
| KR | 20070009231 A | 1/2007 |
| WO | WO 2005098994 A1 * | 10/2005 |
| WO | WO 06/078472 A2 | 7/2006 |
| WO | WO2009025763 A2 | 2/2009 |
| WO | WO 12/013774 A1 | 2/2012 |

OTHER PUBLICATIONS

International Search Report dated Nov. 21, 2012 for corresponding Application No. PCT/US2012/048229.

\* cited by examiner

BIOCOMPATIBLE WIRE BATTERY

BACKGROUND OF THE INVENTION

1. Field of the Invention

The present invention is directed to a rechargeable electrochemical battery, and more particularly to a biocompatible, rechargeable electrochemical battery configured as a wire for powering a device to be implanted in, or proximate to a living organism, as well as any other device requiring non-traditional battery forms.

2. Discussion of the Related Art

Recently, the number of implantable medical devices has dramatically increased. For example, over the last decade, the use of stents, drug eluting stents, pacemakers, defibrillators, ventricular assist devices, glucose infusion pumps and neurostimulators has increased many fold. Some of the above enumerated examples, as well as a number of other implantable and/or non-implantable medical devices are active devices and require power sources for operation. Power sources or batteries that are utilized in conjunction with implantable or non-implantable medical devices typically have stringent specifications imposed on them relative to physical size and performance. Older generation batteries that were designed for implantable medical devices were larger devices with a relatively short useful life. However, with the advent of miniature implantable medical devices for such diverse applications as drug delivery, glucose sensing and monitoring, and neurostimulation, batteries capable of providing useful power and occupying ever smaller volumes are required. In addition to small size, a battery that is to be implanted should preferably include a useful life, insignificant self-discharge rates, a high reliability over a long time period, and compatibility with a patient's internal body chemistry, in other words, it should be as biocompatible as possible. Biocompatible coatings and/or encapsulants may be utilized to meet this need.

Certain battery chemistries, for example, lithium chemistries, require that the battery be hermetically sealed; however, hermetic packaging may make non-standard form factors difficult to achieve. Accordingly, different chemistries may be utilized to eliminate the need for a hermetic seal.

The devices briefly described above are considered to include some of the more traditional energized or power consuming implantable devices. More recently, it has been theorized that active components or components that require energy may be incorporated into traditionally passive devices. For example, contact lenses have provided vision correcting functionality through the incorporation of a refractive quality into the lens. In addition, pigmentation changing qualities may be incorporated into contact lenses to provide cosmetic enhancement, and agents and/or drugs may be incorporated into contact lenses to provide therapeutic functionality. These characteristics are accomplished passively or without the contact lens being energized. Another device that operates in a passive mode is a punctal plug which is utilized to treat dry eyes by slowing the removal of tears through the punctum. However, as stated above, it has been theorized that active components may be incorporated into traditionally passive devices such as contact lenses and/or punctual plugs. For example, an active component of a contact lens may be able to change the refractive power of the lens. In addition, a punctual plug may comprise a microscale sized pump for dispersing a therapeutic agent. As used herein, a punctal plug refers to a device of a size and shape suitable for insertion into the inferior or superior lacrimal canaliculus of the eye through, respectively, the inferior or superior lacrimal punctum.

Accordingly, there exists a need for power supplies in batteries that are compatible with the size and shape requirements of these devices as well as the energy requirements of these new active components. These miniature or micro scale batteries should provide a useful power output, be capable of charging at acceptable rates, have a useful cycle life, be capable of operating for extended periods in a deep discharge modality and substantially safeguard against the risk of electrolyte leakage.

SUMMARY OF THE INVENTION

The biocompatible, rechargeable electrochemical battery of the present invention overcomes a number of the disadvantages associated with currently utilized batteries for implantable and/or non-implantable medical devices as well as non-medical devices.

In accordance with one aspect, the present invention is directed to an electrochemical battery cell. The electrochemical battery cell comprising an anode current collector configured as a wire having a predetermined cross-sectional profile, an anode layer formed and positioned around at least a portion of the anode current collector, a separator layer formed and positioned around at least some portion of the anode layer, a cathode layer formed and positioned around at least a portion of the separator layer, the separator layer being configured to prevent electrical contact between the anode layer and the cathode layer, a cathode current collector formed and positioned around at least a portion of the cathode layer, and an electrolyte establishing ionic conductivity between the anode layer and the cathode layer.

In accordance with another aspect, the present invention is directed to an electrochemical battery cell. The electrochemical battery cell comprising at least one anode current collector configured as a wire having a predetermined cross-sectional profile, at least one cathode current collector configured as a wire having a predetermined cross-sectional profile, the at least one cathode current collector being positioned adjacent to the at least one anode current collector and separated a predetermined distance, wherein each of the at least one anode current collector and the at least one cathode current collectors are configured as pairs, an anode layer formed and positioned around at least a portion of the at least one anode current collector, a cathode layer formed and positioned around at least a portion of the at least one cathode current collector, a separator layer formed and positioned around some portion of both the anode layer and the cathode layer, the separator layer being configured to prevent electrical contact between the anode layer and the cathode layer, and an electrolyte establishing ionic conductivity between the anode layer and the cathode layer.

In accordance with another aspect, the present invention is directed to an electrochemical battery cell. The electrochemical battery cell comprising a cathode current collector configured as a wire having a predetermined cross-sectional profile, a cathode layer formed and positioned around at least a portion of the cathode current collector, a separator layer formed and positioned around at least some portion of the cathode layer, an anode layer formed and positioned around at least a portion of the separator layer, the separator layer being configured to prevent electrical contact between the cathode layer and the anode layer, an anode current collector formed and positioned around at least a portion of the anode layer, and an electrolyte establishing ionic conductivity between the cathode layer and the anode layer.

In accordance with another aspect, the present invention is directed to a device incorporating an electrochemical battery cell. The device comprising a powerable component having at least one set of positive and negative electrical contacts, and a wire form electrochemical battery cell incorporated into or on the powerable component, the wire form electrochemical battery cell having an anode current collector and a cathode current collector interconnected to the at least one set of positive and negative electrical contacts, thereby forming a complete circuit.

In accordance with another aspect, the present invention is directed to a latent electrochemical battery cell. The latent electrochemical battery cell comprising an anode current collector configured as a wire having a predetermined cross-sectional profile, an anode layer formed and positioned around at least a portion of the anode current collector, the anode layer being formed from a precursor reducing material that is convertible to a reducing material, a separator layer formed and positioned around at least some portion of the anode layer, a cathode layer formed and positioned around at least a portion of the separator layer, the cathode layer being formed from a precursor oxidizing material that is convertible to an oxidizing material, where the separator layer is configured to prevent electrical contact between the anode layer and the cathode layer, a cathode current collector formed and positioned around at least a portion of the cathode layer, and an electrolyte establishing ionic conductivity between the anode layer and the cathode layer.

In accordance with another aspect, the present invention is directed to a latent electrochemical battery cell. The latent electrochemical battery cell comprising a cathode current collector configured as a wire having a predetermined cross-sectional profile, a cathode layer formed and positioned around at least a portion of the cathode current collector, the cathode layer being formed from a precursor oxidizing material that is convertible to an oxidizing material, a separator layer formed and positioned around at least some portion of the cathode layer, an anode layer formed and posited around at least a portion of the separation layer, the anode layer being formed from a precursor reducing material this is convertible to a reducing material, wherein the separator layer is configured to prevent electrical contact between the cathode layer and the anode layer, an anode current collector formed and positioned around at least a portion of the outer layer, and an electrolyte establishing ionic conductivity between the cathode layer and the anode layer.

In accordance with another aspect, the present invention is directed to an electrochemical battery cell. The electrochemical battery cell comprising at least one anode current collector configured as a wire having a predetermined cross-sectional profile, at least one cathode current collector configured as a wire having a predetermined cross-sectional profile, the at least one cathode current collector being positioned adjacent to the at least one anode current collector and separated a predetermined distance, wherein each of the at least one anode current collector and the at least one cathode current collectors are configured as pairs, an anode layer formed and positioned around at least a portion of the at least one anode current collector, the anode layer being formed from a precursor reducing material that is convertible to a reducing material, a cathode layer formed and positioned around at least a portion of the at least one cathode current collector, the cathode layer being formed from a precursor oxidizing material that is convertible to an oxidizing material, a separator layer formed and positioned around at least some portion of both the anode layer and the cathode layer, the separator layer being configured to prevent electrical contact between the anode layer and the cathode layer, and an electrolyte establishing ionic conductivity between the anode layer and the cathode layer.

In accordance with another aspect, the present invention is directed to method for forming an electrochemical cell for use with a device. The method for forming an electrochemical cell for use with a device comprising drawing a length of wire form electrochemical battery cell from a supply of the wire form electrochemical battery cell, the wire form electrochemical battery cell comprising an anode current collector and a cathode current collector, separating a predetermined length of the wire form electrochemical battery cell from the supply of the wire form electrochemical battery cell, providing a portion of both the anode current collector and the cathode current collector for making electrical contact with a device to be powered, and configuring the wire form electrochemical battery cell into a predetermined shape for use with the device to be powered.

The biocompatible, rechargeable electrochemical battery of the present invention is in the form of a wire. The wire battery is designed for use in or proximate to the body of a living organism and is a micro scale, easy to utilize, flexible and inexpensive rechargeable electrochemical battery that provides reliable, stable power for any number of corporeal applications. The biocompatible, rechargeable electrochemical battery of the present invention may also be utilized in any number of other suitable applications requiring non-traditional form factors and micro-scale size, for example, smart credit cards or active RFID tags. The battery may be cut to size for a particular application while providing the same open circuit voltage regardless of how the wire is ultimately configured and the length of the wire utilized. Furthermore, for a given cut length of battery, various cross-sectional dimensions may be specified in which various performance attributes may be matched to a given application, for example, to achieve higher capacity.

Conventional batteries have a low length to diameter ratio, commonly referred to as the aspect ratio (e.g. an AA battery has an aspect ratio of approximately 3.7 and an AAA battery has an aspect ratio of approximately 4.7), whereas the wire form battery of the present invention may have a very large length to diameter ratio, on the order of significantly greater than ten to one. It is important to recognize that aspect ratios are relative. This may be particularly advantageous where form factor is a device design constraint. For example, the wire form battery of the present invention may be used to power a wide range of devices, including a contact lens having active components, a punctual plug having active components, an intraocular lens having active components, or a stent having active components to introduce therapeutic agents or promote healing. In certain of these applications, the wire may have to be cut short due to size constraint of the device; accordingly, the aspect ratio may be reduced.

A conventional alkaline battery has a wire-shell construction, for example, an AA type "can", or a top and bottom construction, for example, a button cell. Other "can" batteries use a "jelly roll" construction of a rolled-up laminate to increase the surface area of the materials available for the electrochemical reaction. The wire form battery of the present invention is capable of achieving a greater surface area (of separator) to volume (of active materials) ratio than either conventional construction. This may afford high performance discharge and charge rate capability despite the inherently small dimensions of the battery. In a conventional battery, capacity is specified by standard battery size, whereas in the case of a wire battery, capacity is specified as a linear energy density i.e. micro-amp-hour/min.

A conventional battery is in a metal can that is crimped into a closed container that comprises polymeric vents to allow some out-gassing. In the case of a rechargeable alkaline chemistry, a conventional battery may require certain gas recombination catalysts to prevent rupture of the metal can. In addition, some conventional and rechargeable alkaline batteries require a special battery grade zinc alloy that is both high in purity and also is capable of reducing the rate of a side reaction with zinc and water to produce hydrogen gas which can cause the can to leak or rupture. Prior to recent environmental regulations, mercury was utilized rather than battery grade zinc alloys. The wire form battery of the present invention has no can-type packaging and is essentially open to the environment for both moisture and gas permeability.

BRIEF DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION OF THE PREFERRED EMBODIMENTS

Figure 1:
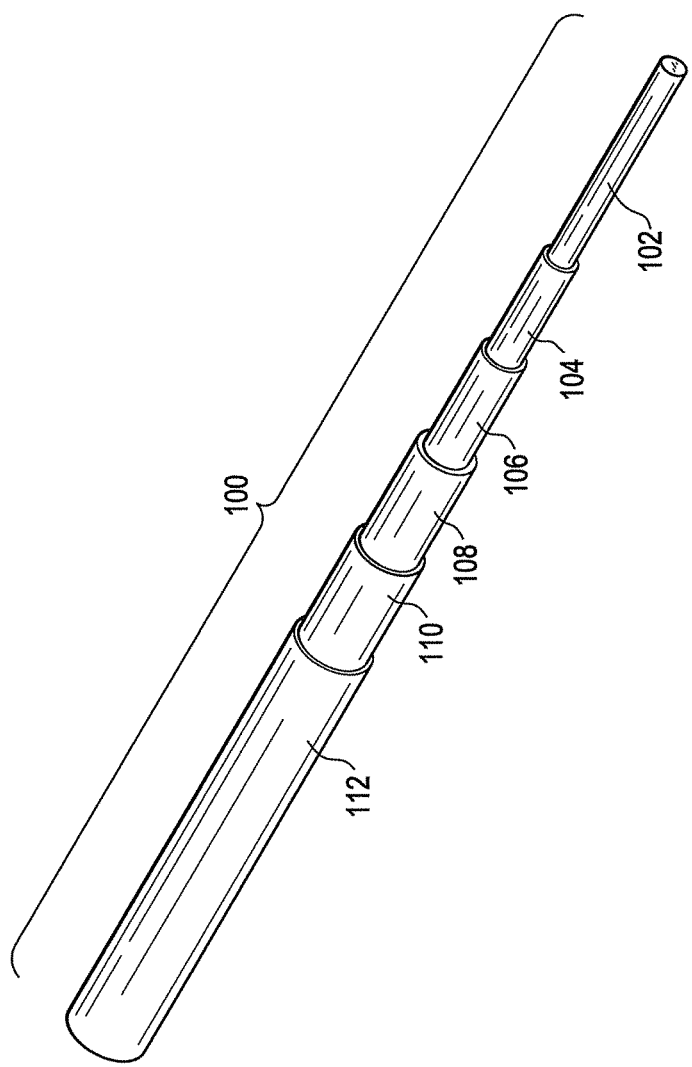
FIG. 1 is a partial cross-sectional, cut-away view of an exemplary biocompatible, single wire battery in accordance with the present invention.

A battery, battery cell or cell is a device wherein the chemical energy contained in the active materials comprising the battery is directly converted into electric energy through an electrochemical oxidation-reduction reaction. These batteries, battery cells, or cells may be broadly classified as primary batteries which are intended and optimized for only one discharge cycle, nonrechargeable, or as secondary batteries which are rechargeable through the reversal of the oxidation-reduction reaction. Primary batteries offer a number of advantages, including good shelf life, high energy density at low to moderate discharge rates, low maintenance and ease of use. Secondary batteries also offer a number of advantages, including high power density, high discharge rate, flat discharge curves and good low temperature performance in addition to its ability to be recharged. A secondary battery typically has a charge retention that is worse than in a primary battery; however, this deficiency is offset by the fact that the secondary battery is rechargeable.

For ease of explanation, the term battery shall be utilized herein to mean a device comprising one electrochemical cell or a plurality of electrochemical cells connected in parallel or series depending on the desired output voltage and capacity.

A third type of battery is a reserve battery. In this type of battery, a segment of the battery is separated from the other components prior to its activation. With no chemical reaction until activation, this type of battery is capable of long term storage.

A battery cell or cell comprises three main components; namely, an anode (negative electrode), a cathode (positive electrode) and an electrolyte (ionic conductor). The anode is the fuel electrode which gives up electrons to the external circuit or load and is oxidized during the electrochemical reaction. The anode material preferably has a high efficiency as a reducing agent, a high coulombic output (Ah/g), good conductivity, good stability, is easy to work with and is low cost. If the battery is to be utilized in the body, the anode material is preferably as biocompatible as it can be made to be, or is protected from making direct contact with the body. The cathode is the oxidizing electrode which accepts electrons from the external circuit or load and is reduced during the electrochemical reaction. The cathode material preferably has a high efficiency as an oxidizing agent, is stable when in contact with the electrolyte, and has a useful working voltage. If the battery is to be utilized in the body, the cathode material, like the anode material, is preferably as biocompatible as it can be made to be, or is protected from making direct contact with the body. The electrolyte is the material that provides the medium for charge transfer, as ions, within the cell between the anode and the cathode. The electrolyte material preferably has good ionic conductivity without being electronically conductive, is electrochemically stable, is nonreactive with the electrode materials, varies little with temperature changes, is safe to handle and is low in cost. Typical electrolytes are aqueous solutions or polymer gels but may comprise other materials and forms such as solid polymer electrolytes. Once again, if the battery is to be used in the body, the electrolyte should be as biocompatible as possible or protected from making direct contact with the body.

The cell may be built in any suitable size, shape and/or configuration that is compatible with its end use. The anode and the cathode are electronically isolated within the cell to prevent a short circuit, but are at least partially wetted by the electrolyte. Accordingly, a separator that is permeable to the electrolyte is utilized to physically separate the anode from the cathode. Essentially, the cell components are designed and configured to accommodate the particular cell shape. The cells may be sealed to prevent and/or control leakage and may also comprise vents to allow accumulated gases to escape. Suitable means for terminal connections are generally required to complete the cell.

Operation of the cell in discharge mode proceeds as follows. When the cell is connected to an external circuit or load, electrons flow from the anode, which is being oxidized, through the external circuit or load, and to the cathode which accepts the electrons and is reduced. Completion of the electric circuit occurs in the electrolyte wherein anions or negatively charged ions flow from the cathode to the anode and cations or positively charged ions flow from the anode to the cathode. Operation of the cell in the charging mode proceeds as follows. A power supply is connected across the electrodes in place of an external circuit and electrons flow into the anode which is now the cathode of the reaction. Essentially, the reaction is reversed with the anode becoming the cathode, the cathode becoming the anode, and the flow of anions and cations being reversed. It is important to note that various charging schemes are available, for example, constant voltage, constant current then constant voltage, pulse charging and the like. The reactions in both the discharge mode and the charge mode may be expressed in simple terms as a standard electrochemical redox reaction which depends on the materials comprising the anode and cathode. Different voltages and capacities may be achieved by utilizing different materials for the electrodes as is explained in detail subsequently The selection of the anode and cathode materials determines the theoretical voltage and capacity of the cell. The maximum energy that may be supplied by a chemical cell is determined by the type of active materials utilized and on the amount of the active materials utilized. As a practical matter, only a portion of the theoretical energy of the cell is realized, and is due to a number of factors, including the weight and volume of the nonreactive components, the fact that the cell does not discharge at the theoretical voltage, thereby lowering the average voltage, and the fact that the cell does not discharge completely to zero volts thereby reducing the delivered Ampere-hours. In addition, in a practical cell, the active materials are not stoichiometrically balanced thereby reducing the energy because an excess amount of only one of the active materials is utilized in the chemical reaction.

In accordance with an exemplary embodiment, the present invention is directed to a nonconventional battery or cell. More specifically, an exemplary biocompatible wire battery is disclosed herein. The exemplary biocompatible wire battery is designed for use in or proximate to the body of a living organism and is preferably a small scale, easy to utilize, inexpensive, flexible, rechargeable electrochemical battery that provides reliable, stable power for any number of corporeal applications as well as non-corporeal applications. While preferred exemplary embodiments of the invention are described herein relative to implantable devices, the wire battery may be utilized for any number of applications. Additionally, in wire form, the battery may be cut to size for a particular application while providing the same output characteristics regardless of how the wire is ultimately configured and the length of the wire utilized. As compared to conventional batteries which have a low aspect ratio (length to diameter), wire form batteries may have a high aspect ratio, for example, significantly greater than 10:1. In certain applications, the wire battery may have to be cut short. In other words, to fit the geometric requirements of any given application, the aspect ratio may be reduced. This may be particularly advantageous where form factor is a desired design attribute. For example, the wire form battery of the present invention may be utilized in conjunction with any number of medical devices that require electrical power such as smart contact lenses, smart punctal plugs and smart intraocular lenses.

The biocompatible wire battery of the present invention may comprise a number of design variations. For example, in one exemplary embodiment, the biocompatible wire battery may comprise a configuration wherein an anode is surrounded by a cathode. In another exemplary embodiment, the biocompatible wire battery may comprise a configuration wherein a cathode is surrounded by an anode. Other exemplary embodiments may include variations of the above designs and are described in detail subsequently. For example, the biocompatible wire battery may comprise a configuration with one or more anode/cathode pairs. In addition, various suitable materials may be utilized for all of the components of the battery as will be described in detail herein. FIG. 1 illustrates a partial cross-sectional, cut-away view of one exemplary biocompatible wire battery 100 in accordance with the present invention.

In the exemplary embodiment illustrated in FIG. 1, the core of the wire battery comprises the anode current collector 102. The anode current collector 102 may comprise any suitable shape, size and material depending upon the use or application of the battery 100. The anode current collector 102 may comprise any suitable electrically conductive material or be fabricated from a nonconductive substrate that is coated with an electrically conductive material. As it may come into contact with the body, the anode current collector 102 is preferably as biocompatible as is practical or protected from the body in any suitable manner. In the illustrated exemplary embodiment, the anode current collector 102 comprises a copper wire with a substantially circular cross-section and having a diameter of about seventy-five (75) microns. The anode current collector 102 may also be plated or coated with materials that limit corrosion or chemical activity such as nickel, gold and/or graphite-based coatings. If plating is utilized, any number of suitable, well-known techniques may be utilized. In addition, if profile and/or size are a critical design constraint and a plating or coating is utilized, the profile of the underlying substrate may be reduced to accommodate the additional layer.

In an alternate exemplary embodiment, the anode current collector 102 may comprise a single carbon fiber filament or a multi-filament carbon fiber yarn. As used herein, carbon or carbon based materials shall include all elemental forms of carbon. Preferably, the amount of anode current collector material should be kept to the minimum amount necessary to provide suitable processing and end use performance. In other words, the anode current collector 102 dimensions are chosen to meet the desired design attributes for its end use.

Carbon fiber filaments in the dimensional ranges described herein are commercially available. For example, a commercial single filament carbon fiber denoted Panex®35 available from Zoltek Companies, Inc. has a diameter of seven (7) microns. Copper and gold wires utilized in wire-bonding of integrated circuits are commercially available in diameters of twenty-five (25) microns or less. In essence, the only limitation on the cross-sectional dimensions of the anode current collector 102 is whether the electrical and mechanical performance attributes may be met using a suitable process.

Concentrically positioned around the anode current collector 102 is the anode layer 104. Although the term concentrically is utilized throughout the specification with regard to the exemplary embodiment of FIG. 1, the various components described herein do not have to be concentrically arranged. As set forth above, the anode layer 104 may comprise any number of suitable materials that act as reducing agents. Anode materials include $H_2$, Li, Na, Mg, Al, Ca, Fe, Zn, Cd, Pb, intercalation compounds of lithium (e.g. $(Li)C_6$), and metal hydrides; however, numerous other materials are available for anode construction and will suggest themselves to ones skilled in the relevant art. The anode layer 104 may comprise any suitable configuration, but preferably conforms to the shape of the anode current collector 102 so that a minimal profile may be achieved. The choice of anode material depends upon a number of factors, including electrochemical activity and compatibility with the environment in which it is to be utilized. As stated above, the anode material is preferably as biocompatible as possible or is protected from making direct contact with the body. The anode layer 104 may comprise a solid structure formed only from the anode material or comprise a solid or porous composite containing the anode material. The anode layer 104 may be positioned around the anode current collector 102 by any suitable means depending upon its makeup, including spray, wire, and dip coating processes.

In the exemplary embodiment, the anode layer 104 comprises zinc particles dispersed in a polymeric matrix. The polymeric matrix of the anode layer 104 may comprise a gel forming polymer such as polyacrylic acid or carboxymethylcellulose; however, this lacks any mechanical integrity; therefore it preferably also comprises a binding polymer, for example, poly(ethylene oxide) or poly(vinyl alcohol) or otherwise some sort of package would be required to support and contain the active materials comprising the battery. The weight percent of zinc particles in the polymeric matrix is determined by the amount of energy required as the output of the battery 100. Other materials may be added into the zinc/polymer matrix. Additional control over the physicochemical properties of the polymeric matrices may be achieved by crosslinking, such as by covalent (chemical) crosslinking or physical crosslinking of chains by crystallites, ionic clusters, or insoluble/immobilized phase separated domains. The anode layer 104 may be crosslinked by any suitable means. In the exemplary embodiment, the practical upper limit on zinc particle size is in the range from about thirty (30)-fifty (50) microns with a mean particle size of about size of about five (5)-ten (10) microns. More preferably, the exemplary anode layer 104 comprises zinc dust with an average particle size of about three (3) microns that is of relatively low purity, about ninety-three (93) percent, and is not a special alloy. However, there may be some benefit to utilizing battery grade zinc alloys of high purity that have a useful particle size distribution. In the exemplary embodiment, the anode layer is about thirty (30) microns thick; however, the thickness may be varied.

The minimum practical thickness of the anode layer 104 is determined by the particle size distribution of the zinc particles as well as the number of coatings utilized to build up the zinc layer. As used herein, the term thickness means the average dry thickness of a coated layer independent of any localized deviations, e.g. clumps, voids and the like, therefrom. In the exemplary embodiment, a minimum practical anode layer thickness is about ten (10) microns. By coating subsequent layers of anode material, the total anode layer thickness may be built up accordingly to achieve a higher capacity cell (or battery) having a larger diameter in its final form. The ratio of zinc to inactive polymer matrix may also be altered or modified accordingly to provide a suitable balance of electrolyte uptake, mechanical integrity, and energy density. In a preferred exemplary embodiment, the dry weight of zinc particles in the anode layer 104 comprises approximately fifty (50) to ninety-eight (98) percent by weight.

The anode layer 104 may also comprise conductive carbon fibers, milled conductive carbon fibers, carbon nanowires and/or carbon nanotubes. These high aspect ratio conductive materials may provide an enhanced electrical continuity throughout the anode layer 104 that could otherwise be disrupted by the polymer binder and its potential swelling by absorption of the electrolyte or environmental moisture. Essentially, these materials may provide certain performance enhancements such as lower internal resistance, greater extent of utilization of active materials as well as mechanical enhancements such as cohesiveness and handleability. These same materials may also be utilized in the cathode layer 108 as described in detail subsequently.

Concentrically positioned around the anode layer 104 is a separator layer 106. As before, the separator layer does not have to be concentric with the layers above or below. The separator layer 106 provides a non-electrically conductive layer between the anode layer 104 and the cathode layer 108 and is described in detail subsequently. The separator layer 106 may comprise any suitable non-electrically conductive material that is permeable to the electrolyte that is dispersed throughout the wire battery 100, as is described in detail subsequently. The separator layer 106 may comprise any suitable configuration, but preferably conforms to the shape of the anode layer 104 so that the minimal profile may be achieved. In the exemplary embodiment, the separator layer 106 is formed in-situ by building up a polymer coating over the anode layer 104 utilizing any suitable process such as dip, wire, or spray coating. The separator layer 106 is preferably thick enough to prevent a short circuit between the anode layer 104 and the cathode layer 108. In the exemplary embodiment, the separator layer 106 is about twenty (20) microns thick; however, the thickness may be varied. As stated above, the separator layer 106 is preferably as biocompatible as possible or is protected from making direct contact with the body.

Examples of suitable separator layer or polymer separation materials include blends of poly(ethylene oxide) and poly(acrylic acid); however, numerous other materials are available for separator construction and will suggest themselves to one skilled in the relevant art. The separator may be crosslinkable by any suitable means. In general, the polymer separator is formulated to have a component that provides good film forming properties and additional components that provide performance enhancements, such as ionic permeability. Furthermore, the polymer separator may also comprise a filler material to help isolate the anode 104 and the cathode 108 from one another. Examples of useful filler materials include aluminum oxide, microcrystalline cellulose (for example, cotton linters), fumed silica, or any other filler material with a suitably small particle size and which is not electrically conductive. The separator layer 104 has the added function of providing an electrolyte reservoir for the battery.

Concentrically positioned around the separator layer 106 is the cathode layer 108. Once again, this layer does not have to be concentric with the layers above or below. As set forth above, the cathode layer 108 may comprise any number of suitable materials that act as oxidizing agents. Cathode materials include $O_2$, $Cl_2$, $SO_2$, $MnO_2$, NiOOH, CuCl, $FeS_2$, AgO, $Br_2$, HgO, $Ag_2O$, $PbO_2$ and $I_2$; however, numerous other materials are available for cathode construction and will suggest themselves to ones skilled in the relevant art. The cathode layer 108 may comprise any suitable configuration but preferably conforms to the shape of the separator layer 106 so that the minimal profile may be achieved. In the exemplary embodiment, the cathode layer 108 is formed over the separator layer 106 utilizing any suitable process such as dip, wire, or spray coating. The choice of cathode material, like that of the anode material, depends upon a number of factors, including electrochemical activity and compatibility with the environment in which it is to be utilized. In the exemplary embodiment, the cathode layer 108 comprises $Ag_2O$ and/or $MnO_2$ in combination with graphite in an ion permeable polymeric binder or in a water and ion permeable polymeric binder that provides mechanical robustness to survive handling and electrolyte uptake while maintaining good electrical conductivity and continuity with the cathode current collector 110. Once again, the cathode layer 108 is preferably as biocompatible as possible or is protected from making direct contact with the body. As is the case with the anode layer 104, the carbon fiber, carbon nanowire, and/or carbon nanotube additives may be utilized in the cathode layer 108. The cathode layer 108 is about forty (40) microns thick; however, the thickness may be varied.

The cathode layer 108 may comprise a powder mixture that is formed by ball milling active material ($Ag_2O$ and/or $MnO_2$), conductive material (graphite and/or carbon fibers, nanowires, and/or nanotubes), and additives (carbon black, dispersants) to ensure thorough mixing. This powder mixture is then dispersed in a solvent solution of polymer binder (polyethylene oxide or PEO/(polyacrylic acid or PAA blend) to form the cathode coating mixture. The cathode coating mixture is then applied on top of the in-situ formed polymer separator layer 106 to form the cathode layer 108. The cathode layer may be crosslinkable by any known means. Preferably, the amounts of active material, conductive additive, and binder polymer are adjusted to balance mechanical, electrical, and processing performance.

Concentrically positioned around the cathode layer 108 is the cathode current collector 110. As the case with the other layers, the cathode current collector 110 does not have to be concentric. The cathode current collector 110 may comprise any suitable shape, size and material depending upon the use or application of the battery 100. The cathode current collector 110 may comprise any suitable electrically conductive material that may be deposited on the cathode layer 108. In the exemplary embodiment, the cathode current collector 110 comprises a graphite and/or silver filled polymer composition. The cathode current collector 110 is about ten (10) microns thick. The cathode current collector 110 is preferably as biocompatible as possible or protected from making direct contact with the body.

Preferably, the cathode current collector 110 composition is applied as a coating, just as the other layers of the wire battery; however the binder polymer of the cathode current collector 110 should not absorb appreciable amounts of electrolyte or water. If this were to happen, the electrical conductivity of the cathode current collector 110 would be reduced, and the performance of the battery would be reduced. Furthermore, certain conductive components in the current collector layer 100 could react with the electrolyte. The cathode current collector 110 should, however, be permeable to water vapor and other gases so that the internal pressure of the battery may be equilibrated with the surrounding environment to avoid the possibility of internal break up of the layers. Suitable materials for the cathode current collector 110 are graphite, silver and/or nickel filled polymers such as conductive silicones or fluoropolymers. Other conductive compositions may be used without limitation, provided that the compositions provide the necessary chemical compatibility with the cathode layer 108 and electrolyte as well as desirable mechanical and electrical properties. The minimum practical thickness will be dictated by the rheological properties of the cathode current collector coating mixture, the particle size of the conductive filler, and the required electrical properties of the cell, noting that the resistivity of the cathode current collector will drive the latter. Typical thicknesses of the cathode current collector 110 may be approximately 10 to 20 microns.

In the case of alternate "reverse" constructions or designs, for example, when an anode layer surrounds a central cathode layer, it should be recognized and understood that the cathode current collector 110 is actually an anode current collector, and that the central wire 102 is a cathode current collector.

Concentrically positioned around the cathode current collector 110 is an insulation layer 112. The insulation layer 112 does not have to be concentrically positioned around any other layer. The insulation layer 112 may comprise any suitable biocompatible material that has sufficient strength to hold the various components of the battery 100 together while providing sufficient flexibility for varied applications. In a wire battery, profile and flexibility are important factors. Preferably, the insulation layer 112 if utilized, comprises a material that is open to the environment for both moisture and gas permeability, while being electrically nonconductive, thus eliminating the need for vents like conventional batteries.

Examples of suitable insulative materials include non-conductive silicones, polyurethanes, fluoropolymers (specifically amorphous fluoropolymers and copolymers), epoxies, enamels, potting compounds, conformal coatings and the like. The thickness of the insulation layer 112 may be as small as necessary to provide total coverage of the directed areas and to provide suitable mechanical and electrical performance. A nominal thickness of the insulation layer 112 may be five (5) microns. A preferred insulative material is the family of parylenes which are vacuum deposited coatings with controllable thickness; however, certain exemplary embodiments of wire battery may preclude the use of parylenes due to various design limitations. Parylenes, such as parylene-C are preferable due to their ability to quickly and uniformly, i.e. conformally, coat irregular substrates without being affected by the chemistry of the surface to be coated.

In an alternate exemplary embodiment, the insulation layer 112 may be part of the cathode current collector 110 as a one piece or unitary structure. For example, the cathode current collector 110 may comprise a single or multi-layer structure that includes all the layers necessary for being a cathode current collector as the inner structure and all the layers necessary for being an insulator as the outer structure. Alternately, the cathode current collector 110 may be made of a material that is both protective and electrically conductive. Conductive silicones and fluoropolymers are examples of such materials.

In the strictest sense, the insulation layer is purely optional with respect to the electrical functionality of the battery. For example, it may be formed as part of the cathode current collector. Alternately, the insulation layer may be part of the medical device. In other words, part of the medical device may act as the insulation layer.

The electrolyte, as described above, is the material that provides the medium for charge transfer, as ions, within the cell between the anode and the cathode. In conventional batteries, strong bases such as sodium hydroxide, NaOH, and potassium hydroxide, KOH, are utilized; however in the present invention, a weak base and/or ionic liquids, which may be pH neutral or buffered to controlled pH levels, may be utilized so as to be more biocompatible. Nevertheless, strong bases such as NaOH and KOH remain as viable electrolyte components for the wire battery of the present invention. Ionic liquids are salts that are in the liquid state. Salts that are liquid at near ambient temperatures, also known as room temperature ionic liquids, may be particularly useful for use in electrochemical batteries.

As described above, various designs and material modifications may be used within the construct of the biocompatible, rechargeable electrochemical wire battery, including the rearrangement of the various components. In addition, binding agents may be utilized between the various components to aid in holding the various components together.

Typically, these binding agents are the same materials as those used in various layers of the wire battery, and comprise a film forming polymer blended with an ion permeable polymer. In certain cases, the binding agents may be substantially different or unique formulations, depending on the particular application.

Figure 2:
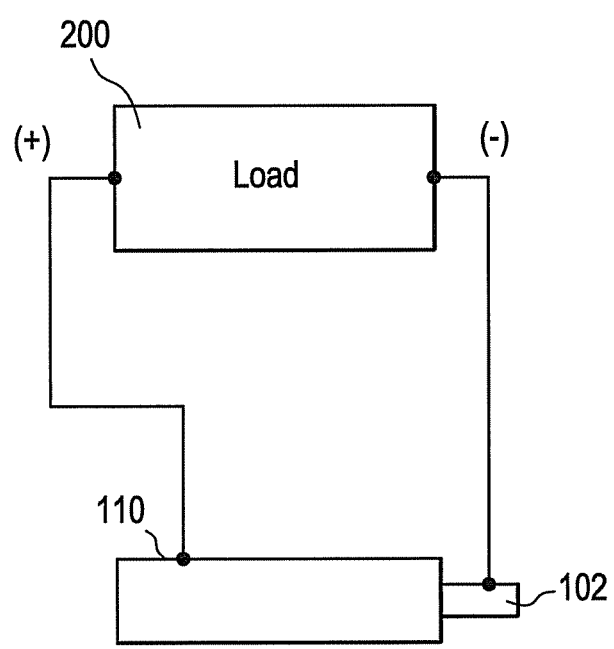
FIG. 2 is a diagrammatic representation of a simplified circuit utilizing the biocompatible, single wire battery in accordance with the present invention.

Referring to FIG. 2, there is illustrated a diagrammatic representation of a simple circuit utilizing a predetermined length of the biocompatible wire battery 100. As illustrated, the biocompatible wire battery 100 is connected to an external circuit or load 200. The anode current collector 102 is connected to the negative terminal of the load 200 and the cathode current collector 110 is connected to the positive terminal of the load 200 thereby completing the circuit. The connections to the load 200 may be made by any suitable means, for example, through conductive epoxy connections. The type of connection determines how much of the anode current collector 102 and the cathode current collector 110 are revealed. It is important to note that whatever tool is utilized to cut and/or otherwise expose the current collectors, care must be taken to avoid any situation that would cause a short circuit by having the anode layer 104 or anode current collector 102 making contact with the cathode layer 108 or cathode current collector 110. It is important to note that FIG. 2 is for illustration purposes only and does not represent actual connections.

The anode and cathode materials determine the voltage and capacity of the cell. Essentially, the voltage is determined by the type of active material utilized and the Ampere-hour capacity is determined by the amount of active material utilized. Accordingly, the open circuit voltage of the biocompatible wire battery 100 is essentially independent of the length of wire battery utilized, but the capacity is not. However, it is important to note that for any battery cell design, there will be a minimum length where open circuit voltage will begin to be reduced substantially if the battery is shortened because the internal resistance of the battery is inversely related to wire battery length and the higher internal resistance values will lower the open circuit voltage of the cell. Since the length of the battery may change with a particular application, the design of the battery, including the choice of materials and the amount of materials may be adjusted to meet the particular application. For example, the concentrations of the active materials or density of the active materials may be altered without significant impact on the profile. Alternately, the active layers may be thicker. In yet another alternate exemplary embodiment, additional materials may be utilized as additives as described herein.

In accordance with an alternate exemplary embodiment, a two wire or wire battery is disclosed with one wire being the anode current collector and the other being the cathode current collector. Multiples of these types of batteries may be arranged in parallel for more capacity and/or arranged in series for higher voltages as described in more detail subsequently. This type of arrangement or design offers both a number of advantages and disadvantages which are set forth in detail below.

Figure 3:
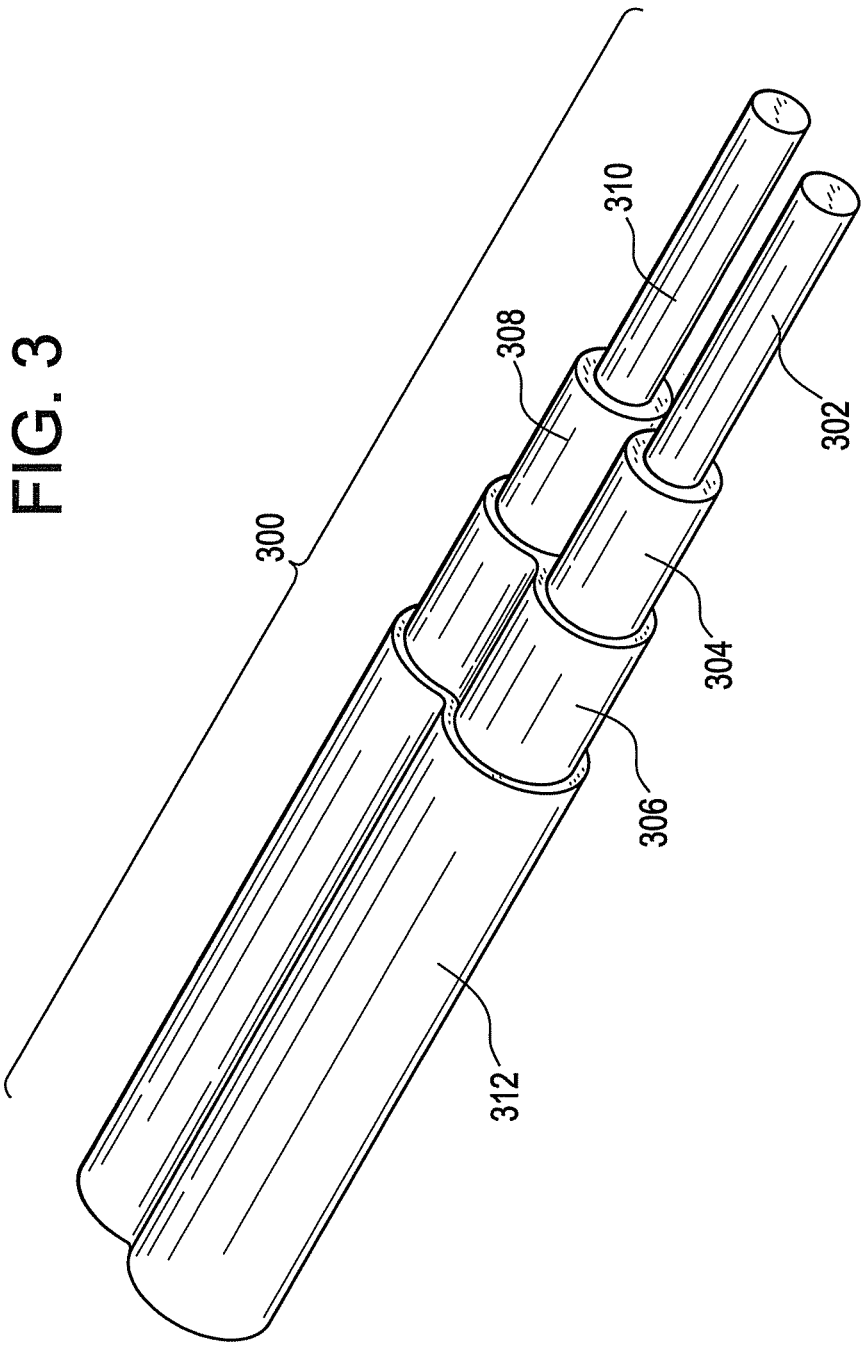
FIG. 3 is a partial cross-sectional, cut-away view of an alternate exemplary biocompatible, two wire battery in accordance with the present invention.

Referring to FIG. 3, there is illustrated a partial cross-sectional, cut-away view of the alternate exemplary biocompatible wire battery 300 in accordance with the present invention. In this exemplary embodiment, the core of the wire battery comprises both an anode current collector 302 and a cathode current collector 310 that run substantially parallel to one another. As set forth in the previous exemplary embodiment, both the anode and cathode current collectors 302 and 310 may comprise any suitable shape, size and material depending upon the use or application of the battery 300. In a preferred exemplary embodiment, both current collectors 302, 310 are formed from a metallic wire with a substantially circular cross-section, although alternate cross-sectional profiles may be used without limitation, for example, square cross-sections may be utilized. Positioned around the anode current collector 302 is the anode layer 304 and positioned around the cathode current collector 310 is the cathode layer 308. As in the previously described exemplary embodiment, these layers 304 and 308 may be formed from any of the same suitable materials utilizing any of the same processes. Positioned around both the anode layer 304 and the cathode layer 308 is the in situ formed separator layer 306. Once again, the separator layer 306 may comprise any of the same materials as set forth in the previously described exemplary embodiment utilizing any of the same fabrication processes. Positioned around the separator layer 306 is the insulation layer 312 which may also comprise the same materials and configurations as set forth in the previously described exemplary embodiment utilizing any of the same fabrication processes. In addition, the electrolyte may also be the same.

With this parallel, two metallic wire design, a number of advantages may be recognized. In having true metallic current collectors for both the anode and cathode, solderable interconnects for both may be utilized, for example, copper on the anode side and nickel on the cathode side. In addition, this dual metallic wire design is more robust than a single wire design for obvious reasons. The two wire battery of the present invention may be twisted into a double helix to provide additional mechanical support to the overall structure. The number of turns per unit length may be varied without limitation so long as the two wire battery remains functional. In other words, the integrity of the underlying structure must remain intact. With respect to processing, no current collector coating step is required and the total number of coatings or coating is reduced thereby minimizing the risk of changing and/or damaging the underlying coating. The two wire design also offers less chance or reduced risk of shorting the anode to the cathode when trimming the wire to length due to crimping, and less risky contact area between the anode and the cathode, thereby reducing the risk of internal short circuit through the separator-layer. This design also offers a less restricted diffusion pathway for moisture and off-gassing. Finally, the interconnects may be made on the same end or opposite ends.

Multiple two wire anode-cathode pairs may also be integrated and alternated to form a multi-wire battery having 2, 3, 4, or more discrete anode/cathode pairs. In order for this arrangement to function, each anode/cathode pair should be electrically and ionically isolated from adjacent anode/cathode pairs. In other words, an electronic and an ionic insulator should be present around each anode/cathode pair in the multi-wire configuration. This may be accomplished by fusing or over coating two or more discrete two-wire batteries with a suitable insulative material, such as those mentioned above, by any convenient means such as dip, wire, or spray coating to form a multi wire battery. The multiple two-wire batteries may be assembled parallel to each other to form a flat "ribbon," or they may be assembled into a bundle or any other useful configuration such as a braid. The same may also be said for a single wire battery, so long as each adjacent single-wire cell is electrically and ionically insulated from one another. Such a construct offers further mechanical advantages and the flexibility to interconnect each of the individual cathode/anode pairs into various series and/or parallel arrangements, depending on the need. In the case of a multi-wire battery, the open circuit voltage may be multiplied by interconnecting adjacent cells in a series modality.

The interconnect on the single wire design may be made anywhere one can safely remove the insulation layer if an insulation layer is required. When the insulation layer and the outermost current collector are one and the same, the outermost interconnect may be made on the exterior of the single wire design or construct.

The disadvantages associated with the two or multi wire designs are fewer than the advantages and include a lower ratio of actives to inactives, and the discharge rates may be reduced due to increased distance for ionic transport.

Figure 4:
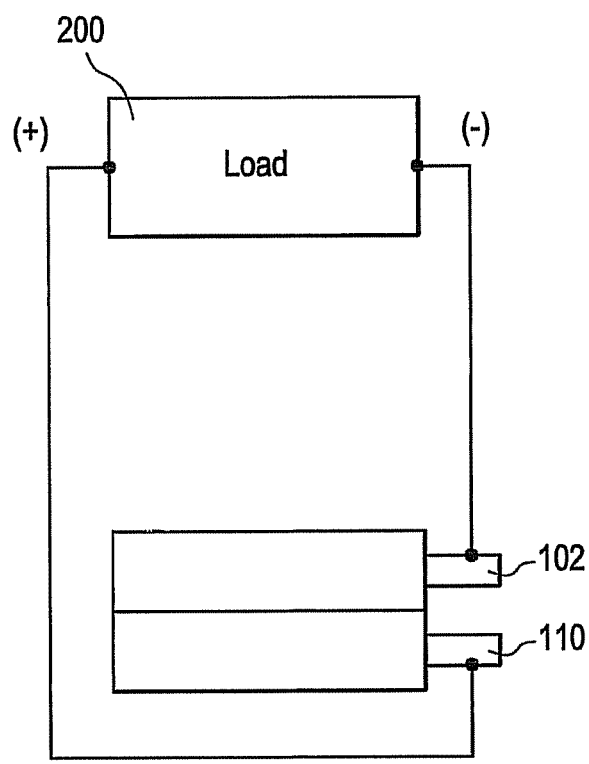
FIG. 4 is a diagrammatic representation of a simplified circuit utilizing the exemplary biocompatible, two wire battery in a parallel configuration in accordance with the present invention.
Figure 5:
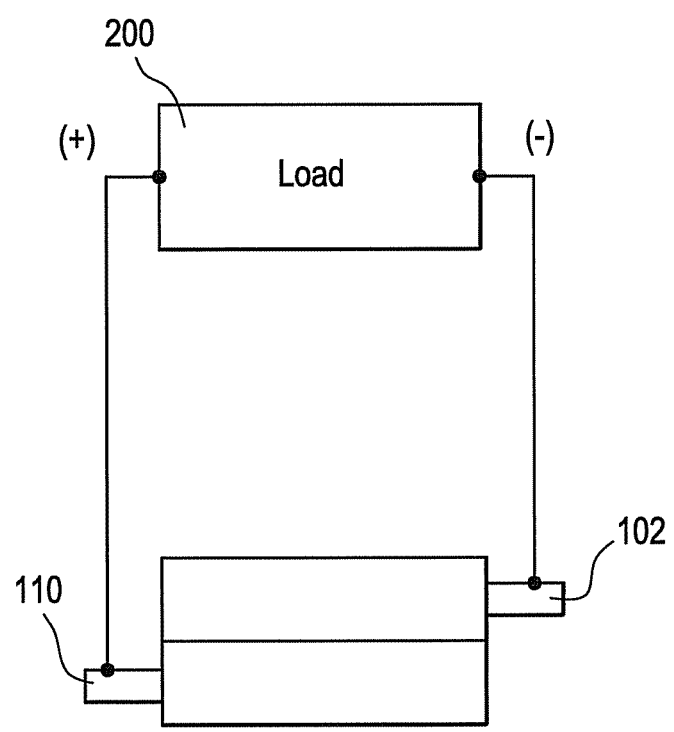
FIG. 5 is a diagrammatic representation of a simplified circuit utilizing the exemplary biocompatible, two wire battery in an anti-parallel configuration in accordance with the present invention.
Figure 6:
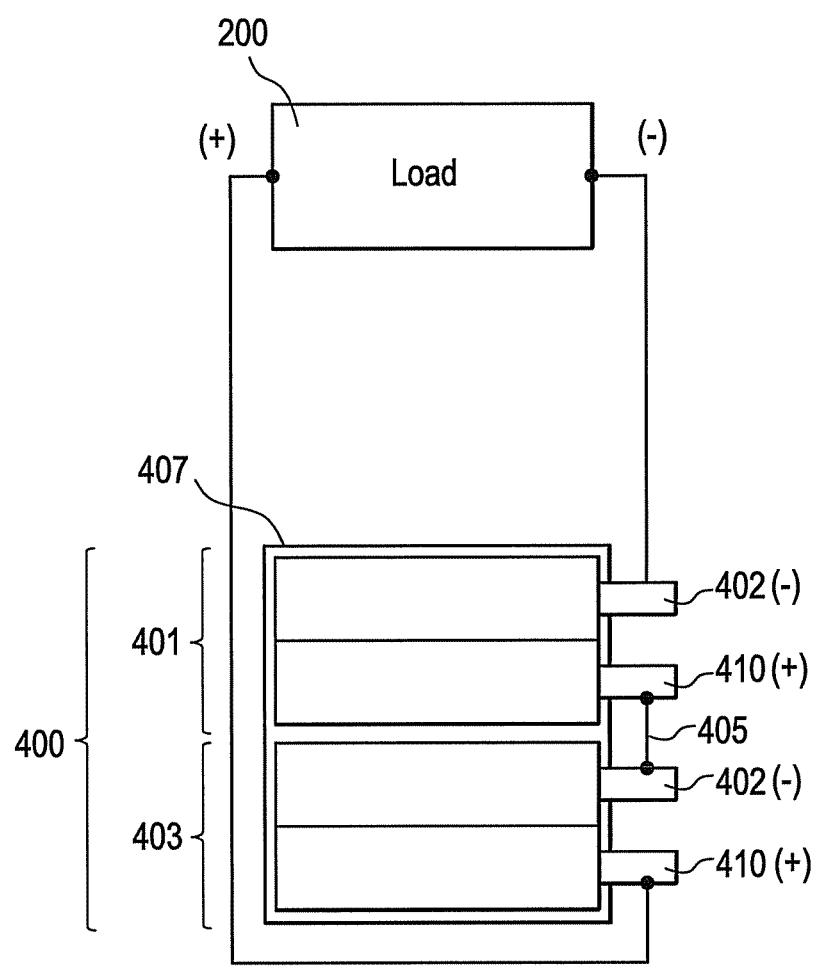
FIG. 6 is a diagrammatic representation of a simplified circuit utilizing an exemplary biocompatible, multi wire battery in a parallel configuration with adjacent cells connected in series in accordance with the present invention.

FIGS. 4-6 illustrate exemplary circuit constructions for two and four wire or strand battery cell designs. In FIG. 4, the positive terminal of the load 200 is connected to the cathode current collector 110 and the negative terminal of the load 200 is connected to the anode current catheter 102. This connection layout illustrates a two wire battery connected to the load 200 in a parallel configuration. In FIG. 5, the positive terminal of the load 200 is connected to the cathode current collector 110 on one side of the battery and the negative terminal of the load 200 is connected to the anode current collector 102 on the other side of the battery, thereby configuring the circuit in an anti-parallel arrangement.

FIG. 6 illustrates a four stranded wire battery 400 connected to a load 200. The four stranded wire battery 400 comprises two, two wire cells 401 and 403 connected in series via an inter-cell interconnector 405, which may comprise any suitable material, connecting the cathode current collector 410 from cell 401 to the anode current collector 402 of cell 403. The four stranded wire battery 400 also comprises an ionic and electrical insulator 407 surrounding the two cells 401 and 403. The series interconnect doubles the nominal voltage output of the battery 400. Series connections change the voltage output while parallel arrangements change capacity. The positive electrode of the load 200 is connected to the cathode insert collector 410 of cell 403 and the negative terminal of the load 200 is connected to the anode of cell 401 to complete the circuit. It is important to note that these are only for illustrative purposes only, and that various other configurations are possible.

In some exemplary embodiments of the present invention, it may be desirable to assemble and/or store a wire battery in a substantially discharged or inactive state that may later be charged or activated prior to use as a power source. One reason for doing this would be to limit undesirable side reactions or morphological changes in the materials used. For example, it is well known that zinc electrodes undergo a slow side reaction with water in the presence of aqueous electrolyte that produces zinc oxide and hydrogen gas. Some carbon materials are known to catalyze this side reaction. Furthermore, some ionic species are known to migrate within electrochemical cells, which may affect cell performance and/or useful lifetime.

By forming the battery with an anode precursor, such as zinc oxide particles, and with a suitable cathode precursor, such as silver metal particles, a latent wire battery may be produced that contains little or no zinc metal capable of adverse side reactions. Such a latent wire battery may be stored separately or integrated into any device that may be stored for some period of time before the device is put into use. Prior to use, a first charging cycle (formation) is initiated to form the electrodes (anode and cathode) from their respective precursors. An additional benefit of this method is that different morphologies of anode precursor and cathode precursor materials are commercially available in different purities that may not be readily available for the corresponding cathode and anode materials. For example, very high purity materials or nano particles, nanowires, or flakes with high aspect ratios may be available as cathode and/or anode precursor materials. By forming a latent wire battery with such materials, the processability and manufacturability of a wire battery of the present invention may be made more desirable in a number of ways. Furthermore, concerns around battery shelf-life and self-discharge during the shelf life may be substantially eliminated by employing this methodology.

In accordance with the exemplary embodiments described herein, the wire battery may be cut to length utilizing any number of devices. For example, the wire battery may be cut to length to fit a particular device using any number of shear-type cutting devices, however, it must be done in a manner so as not to create a short between the anode and cathode or the anode current collector and the cathode current collector. Generally, two sides of the wire battery should be supported, then a controlled shearing cut may be made, e.g. with a razor blade, perpendicularly to the central axis of the wire. In some cases, this shearing cut may go all the way through the wire battery. In other cases, it may be desirable for the shear cut to stop at the central wire or wires. A circumferential cut may be made, for example, by rotating a single wire battery about its central axis while simultaneously bringing a sharp blade down perpendicularly to the central axis of the wire, stopping when the blade is approximately intersecting the metal wire. Two such cuts may be made a short distance apart from each other, and the material between the two circumferential cuts may be removed using any convenient means, for example, scraping, abrasion, water jet, and the like, thereby exposing the central metal wire for subsequent cutting and/or interconnection. An alternate means of cutting a wire battery to length is a nipping process, for example, using a pair of nippers or diagonal cutters. The aforementioned methods of cutting a wire battery are by no means exhaustive, and any suitable and available method may be utilized so long as the resulting cut does not short circuit the cell or cells.

The wire battery may be incorporated into a device in a manner which precludes the need for a discrete insulator layer. The wire battery may be cut and formed to the desired shape then positioned onto or into the device using any suitable means, for example, by using a UV-curable adhesive, and then by making the electrical interconnections, for example, with solder or conductive expoxy. Alternately, the interconnections may be made prior to fixing the wire battery into its desired position. It should be understood that in using a single-wire or multi-strand wire battery without an insulator in such a manner, the electrolyte could be exposed to adjacent portions of the device. Therefore, it may be necessary to ensure that other portions of the device are designed to be compatible with the particular electrolyte, which could be corrosive or reactive. In such cases, it may be desirable to form an insulating layer in-situ for example, by using a conformal coating or a potting compound. In this manner, the insulator material should still maintain the desirable attributes of the integral insulator layer described above; namely, that it is both water and gas permeable. Suitable conformal coatings and/or potting compounds are commercially available from a wide variety of suppliers. The insulator material may be varied without limitation according to the intended use and requirements of the device.

In fabricating batteries or battery cells in accordance with the present invention, it is important to note that a wide range of materials and manufacturing processes may be utilized. In general, the materials selected and the processes utilized should be combined to fabricate a battery which offers good mechanical handling and good electrical performance via a process that is safe, reliable and repeatable. The material(s) forming each of the components of the battery are preferably selected to meet these design criteria as well as to meet the electrical output criteria required for the device to be powered, and to be mechanically and chemically compatible with the device to be powered. Accordingly, once the materials are selected, testing is required to determine if the components of the battery are performing as desired. Therefore, testing devices and methodologies must be developed to accommodate these new devices. In addition, the process for fabricating batteries in accordance with the present invention involves optimizing the processing techniques once the desired materials and profiles are selected and tested. Finally, interconnecting the batteries in a manner that does not partially destroy or change them in any way must be accounted for in integrating them into the device in which they are to be utilized.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. An electrochemical battery cell comprising:
    an anode current collector configured as a wire having a predetermined cross-sectional profile with a thickness of about 25 microns, the anode current collector is the core of the battery cell, wherein the anode current collector is plated with a material that prevents chemical activity;
    an anode layer formed and positioned concentrically around at least a portion of the anode current collector, the anode layer having a thickness in the range of 10 to 30 microns and conforming to the anode current collector, the anode layer comprising zinc particles dispersed in a polymeric matrix including a gel forming polymer and a binding polymer, including at least one of poly (ethylene oxide) or poly (vinyl alcohol);
    a separator layer formed and positioned concentrically around at least a portion of the anode layer, the separator layer having a thickness of about 20 microns and conforming to the anode layer;
    a cathode layer formed and positioned concentrically around at least a portion of the separator layer, the cathode layer having a thickness of about 40 microns and conforming to the separator layer, the cathode layer comprising a cathode coating mixture formed from a powder mixture and solvent including at least one of $Ag_2O$ and $MnO_2$ in combination with at least one of graphite in an ion permeable polymeric binder or in a water and ion permeable binder, the cathode coating mixture being applied directly on the separator layer;
    a cathode current collector formed and positioned concentrically around at least a portion of the cathode layer, the cathode current collector having a thickness in the range of 10 to 20 microns;
    an insulation layer formed and positioned concentrically around at least a portion of the cathode current collector, the insulation layer having a thickness of about 5 microns; and
    an electrolyte establishing ionic conducting between the anode layer and the cathode layer, wherein the electrochemical battery cell has a length to diameter ratio of greater than 10 to 1.

* * * * *